(12) United States Patent
Zebrun et al.

(10) Patent No.: US 11,521,004 B1
(45) Date of Patent: Dec. 6, 2022

(54) HANDHELD-COMPUTER ADAPTER FOR SLED

(71) Applicant: Bell Textron Inc., Fort Worth, TX (US)

(72) Inventors: Michael Zebrun, Fort Worth, TX (US);
Evan Engle, Waxahachie, TX (US);
David Manning, Benbrook, TX (US);
Adam Fay, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/410,014

(22) Filed: Aug. 24, 2021

(51) Int. Cl.
*G06K 7/10* (2006.01)

(52) U.S. Cl.
CPC ..... *G06K 7/10881* (2013.01); *G06K 7/10386* (2013.01); *G06K 2007/10524* (2013.01)

(58) Field of Classification Search
CPC ........... G06K 7/10881; G06K 7/10386; G06K 2007/10524
See application file for complete search history.

(56) References Cited

U.S. PATENT DOCUMENTS

| | | | | |
|---|---|---|---|---|
| 5,008,519 A * | 4/1991 | Cunningham | ......... | G06Q 30/02 235/487 |
| 5,305,181 A * | 4/1994 | Schultz | ................. | G06Q 10/08 361/679.02 |
| 7,443,295 B2 * | 10/2008 | Brice | .................... | B62B 3/1424 340/5.91 |
| 2002/0063159 A1 * | 5/2002 | Wilz | .................... | G06K 7/1443 235/462.31 |
| 2005/0127185 A1 * | 6/2005 | Wilz | .................. | G06K 7/10693 235/462.31 |
| 2006/0113382 A1 * | 6/2006 | Singgih | ................ | F16M 13/005 235/383 |
| 2008/0230603 A1 * | 9/2008 | Stawar | ................. | G06Q 20/203 235/383 |
| 2008/0237339 A1 * | 10/2008 | Stawar | ................... | B62B 3/142 235/383 |
| 2016/0055357 A1 * | 2/2016 | Hicks | .................. | G06Q 20/204 235/383 |
| 2016/0094070 A1 * | 3/2016 | Mazzone | ................ | H02J 7/025 320/115 |

FOREIGN PATENT DOCUMENTS

EP    2 330 334    *   6/2011   .......... G07G 1/0045

* cited by examiner

*Primary Examiner* — Thien M Le
(74) *Attorney, Agent, or Firm* — Shackelford, Bowen, McKinley & Norton, LLP

(57) ABSTRACT

A system includes a handheld-computer case and a sled adapter. The handheld-computer case includes a body portion adapted to receive a handheld computer. The sled adapter includes a pedestal adapted to receive the handheld-computer case and a base portion adapted to mount the sled adapter to a sled. The body portion is positioned at a 45-90° angle relative to the base portion.

18 Claims, 5 Drawing Sheets

HANDHELD-COMPUTER ADAPTER FOR SLED

TECHNICAL FIELD

The present disclosure relates generally to an adapter suited to mount an electronic device to a sled and more particularly, but not by way of limitation, to an adapter suited to mount a smartphone or camera to a sled with RFID capability.

BACKGROUND

This section provides background information to facilitate a better understanding of the various aspects of the disclosure. It should be understood that the statements in this section of this document are to be read in this light and not as admissions of prior art.

A sled is a handheld reader that includes a capability of reading one or more of barcodes, QR codes, and radio-frequency identification ("RFID") tags. Sleds typically used to identify, classify, and locate assets and inventory. Some sleds are adapted to interoperably communicate with a handheld computer such as, for example, a smartphone, via BLUETOOTH. In a typical embodiment, functionality of the handheld computer is leveraged by the sled. Such functionality may include camera and global positioning system ("GPS") functions of the handheld computer.

FIG. 1 illustrates an example of a prior art sled 100. The sled 100 includes a trigger 102, a handle 104, a handheld-computer mounting area 106, a barcode-reader window 108, and an RFID-reader section 110. In a typical embodiment, the handheld-computer mounting area 106 includes a removable battery-compartment cover.

FIG. 2 illustrates a prior art sled-and-handheld-computer system 200. The sled-and-handheld-computer system 200 includes the sled 100 of FIG. 1, a handheld computer 202, and a mounting bracket 204 that attaches the handheld computer 202 to the handheld-computer mounting area 106. A screen portion 206 of the handheld computer 202 may be accessed when the handheld computer 202 is attached to the sled 100. Moreover, as is apparent from FIG. 2, a rear-facing camera (not shown) of the handheld computer 202 opposite the screen portion 206 is obscured by the handheld-computer mounting area 106. Thus, the handheld computer 202 must be separated from the sled 100 in order to use the rear-facing camera of the handheld computer 202. In addition, in a typical use case, the position of the sled 100 in a user's hand must be tilted up periodically during use to allow user to clearly see the screen portion 206 of the handheld computer 202 and otherwise access the handheld computer 202.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A system includes a handheld-computer case and a sled adapter. The handheld-computer case includes a body portion adapted to receive a handheld computer. The sled adapter includes a pedestal adapted to receive the handheld-computer case and a base portion adapted to mount the sled adapter to a sled. The body portion is positioned at a 45-90° angle relative to the base portion.

A system includes a handheld-computer case and a sled adapter. The handheld-computer case is adapted to hold a handheld computer in a position in which a rear-facing camera of the handheld computer has an unobstructed view. The sled adapter is adapted to receive the handheld-computer case and to be mounted to a sled.

A method includes receiving, by a handheld-computer case, a handheld computer and selectively connecting the handheld-computer case to a sled adapter via a key-and-keyhole arrangement. A screen of the handheld computer is positioned at a 65-85° angle relative to the sled adapter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 3:
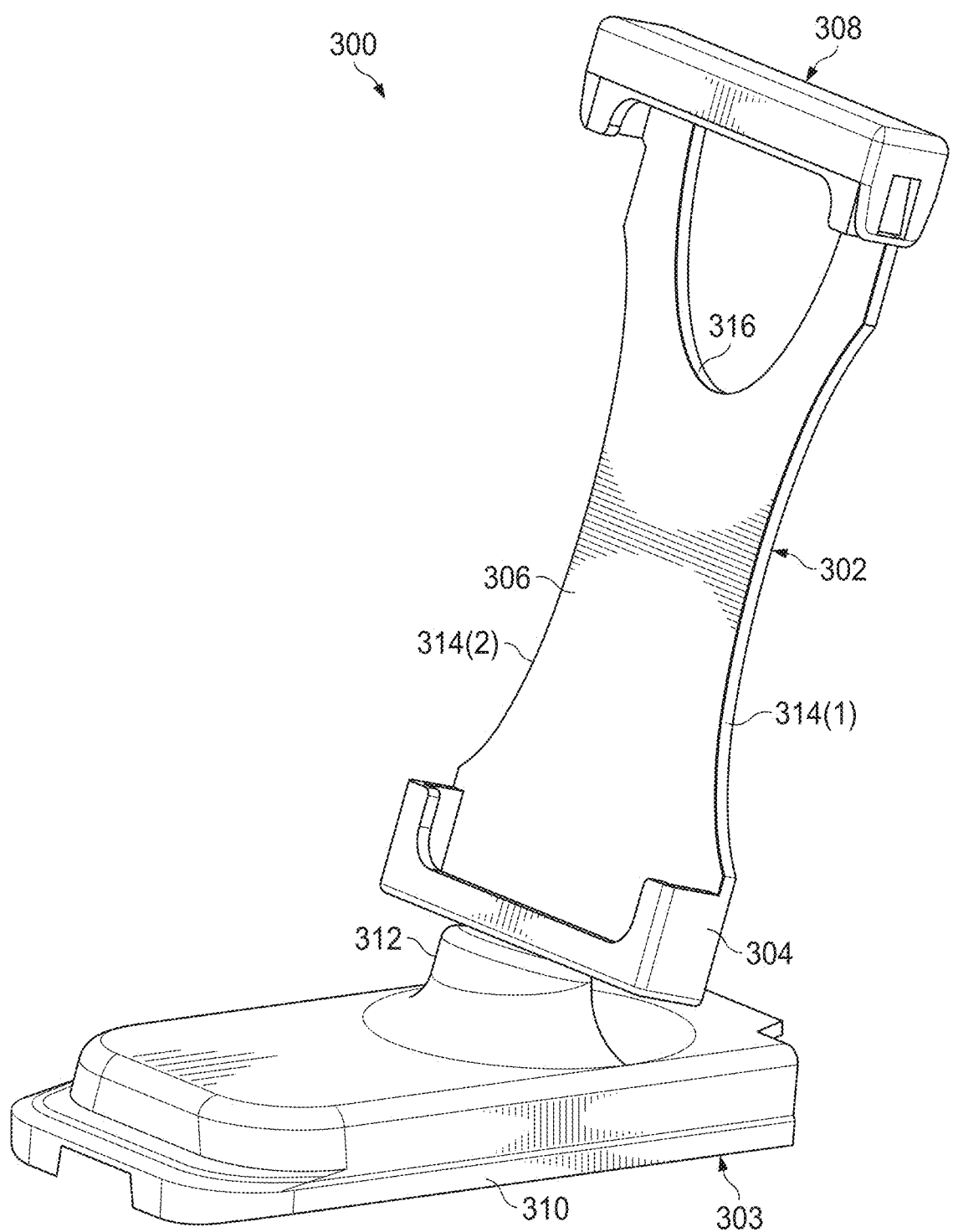
FIG. 3 illustrates a perspective view of an assembled handheld-computer adapter for use with a sled.

FIG. 3 illustrates a perspective view of an assembled handheld-computer adapter for use with a sled. In FIG. 3. an assembled handheld-computer adapter 300 is shown in a perspective view. The handheld-computer adapter 300 includes a handheld-computer case 302 and a sled adapter 303. The handheld-computer case 302 includes a base bracket 304, a body portion 306 and a cap 308. In a typical embodiment, the cap 308 is removable in order to facilitate insertion of a handheld computer into the handheld-computer case 302.

The sled adapter 303 includes a base portion 310 that is adapted to fit on the handheld-computer mounting area 106. In some embodiments, the base portion replaces a removable battery-compartment cover of the sled 100. The sled adapter 303 also includes a pedestal 312 that supports the handheld-computer case 302 and from which the handheld-computer case 302 can be selectively attached and detached.

The body portion 306 as illustrated includes indented curved edges 314(1) and 314(2) on the sides thereof. The indented curved edges 314(1) and 314(2) allow a handheld computer with one or more of side buttons and edge screen features to be accessed when inserted into the handheld-computer case 302. In similar fashion, a top curved edge 316 allows a rear-facing-camera lens to have an unobscured view when the handheld-computer is inserted into the handheld-computer case 302. Those having skill in the art will appreciate that the indented curved edges 314(1), 314(2), and 316 need not necessarily be curved as illustrated but could assume any suitable shape that achieves the objectives noted above.

Figure 1:
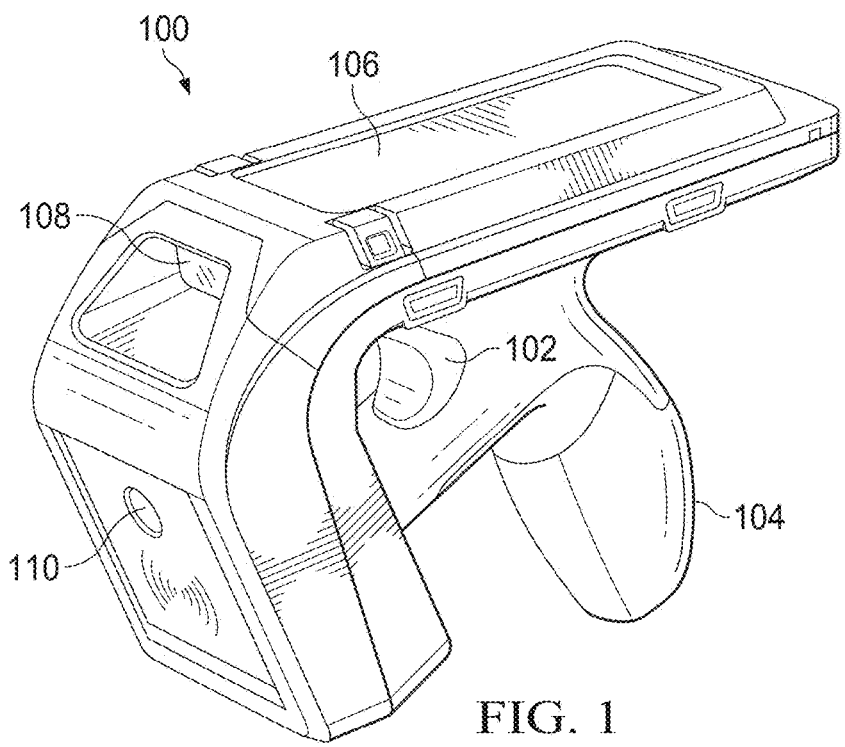
FIG. 1, previously described, illustrates a prior art sled.
Figure 2:
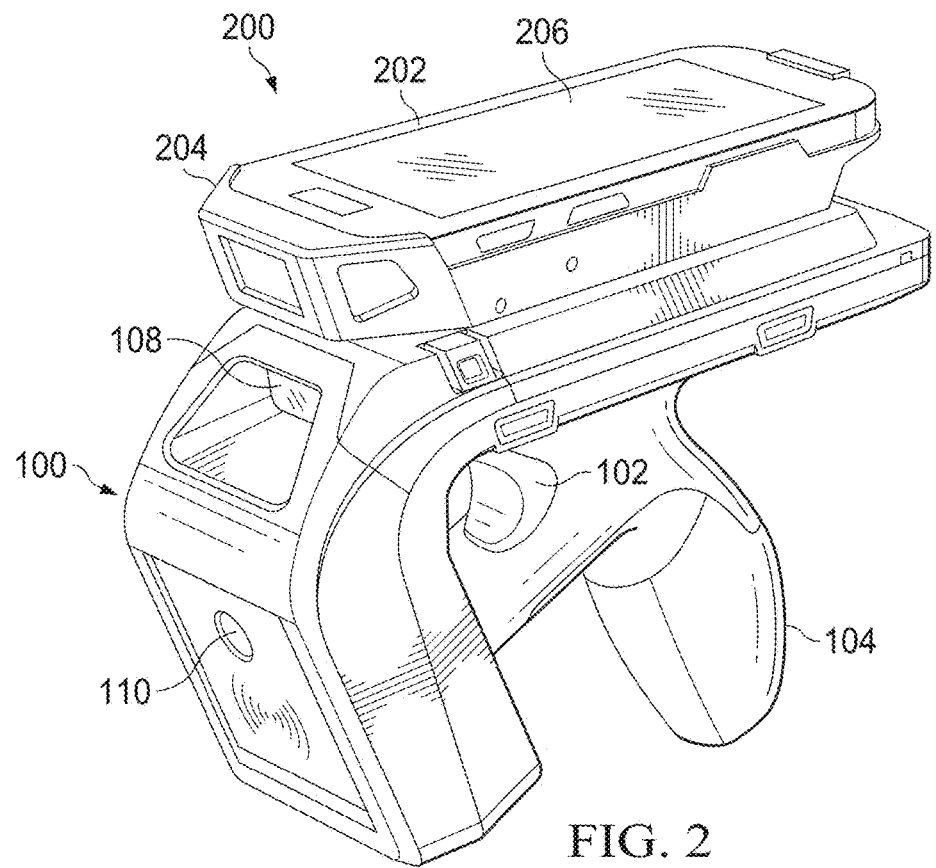
FIG. 2, previously described, illustrates a prior art sled and handheld-computer system 200.

When a handheld-computer has been inserted into the handheld-computer case 302 and the handheld-computer adapter 300 has been mounted to the sled 100, a user has unobstructed access to a screen, buttons, and other features of a handheld computer without having to change a hand position of the sled 100 in order to see the screen as would be the case with the sled and handheld-computer system 200 of FIG. 2. In addition, if a handheld computer includes a camera, which need not necessarily be the case, the camera can be used without the handheld computer being detached from the sled 100, since the camera lens is not obscured as with the arrangement shown in FIG. 2.

Figure 4:
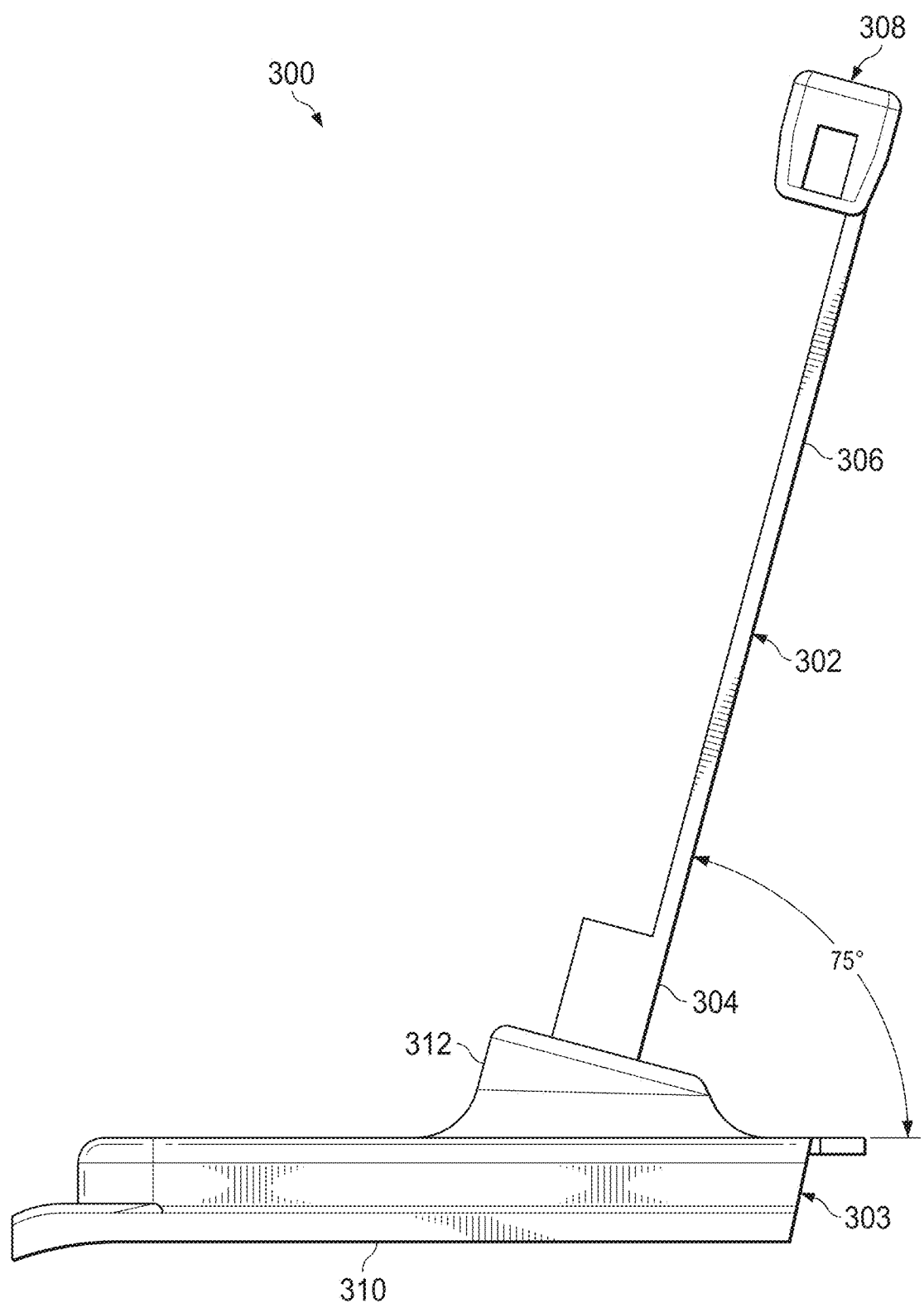
FIG. 4 illustrates a side view of the assembled handheld-computer adapter.

FIG. 4 illustrates a side view of the assembled handheld-computer adapter 300. In order to facilitate use of a handheld computer when mounted to the sled 100, a nominal angle of 75° between the body portion 306 and the sled adapter 303 is shown. Those having skill in the art will appreciate that an angle of 75° is merely illustrative and that any angle between 0° and 180° that permits access to a screen and other controls of the handheld computer without a need for the handheld computer to be detached from the sled 100 and is otherwise ergonomically suitable can be used in accordance with design considerations.

Figure 5A:
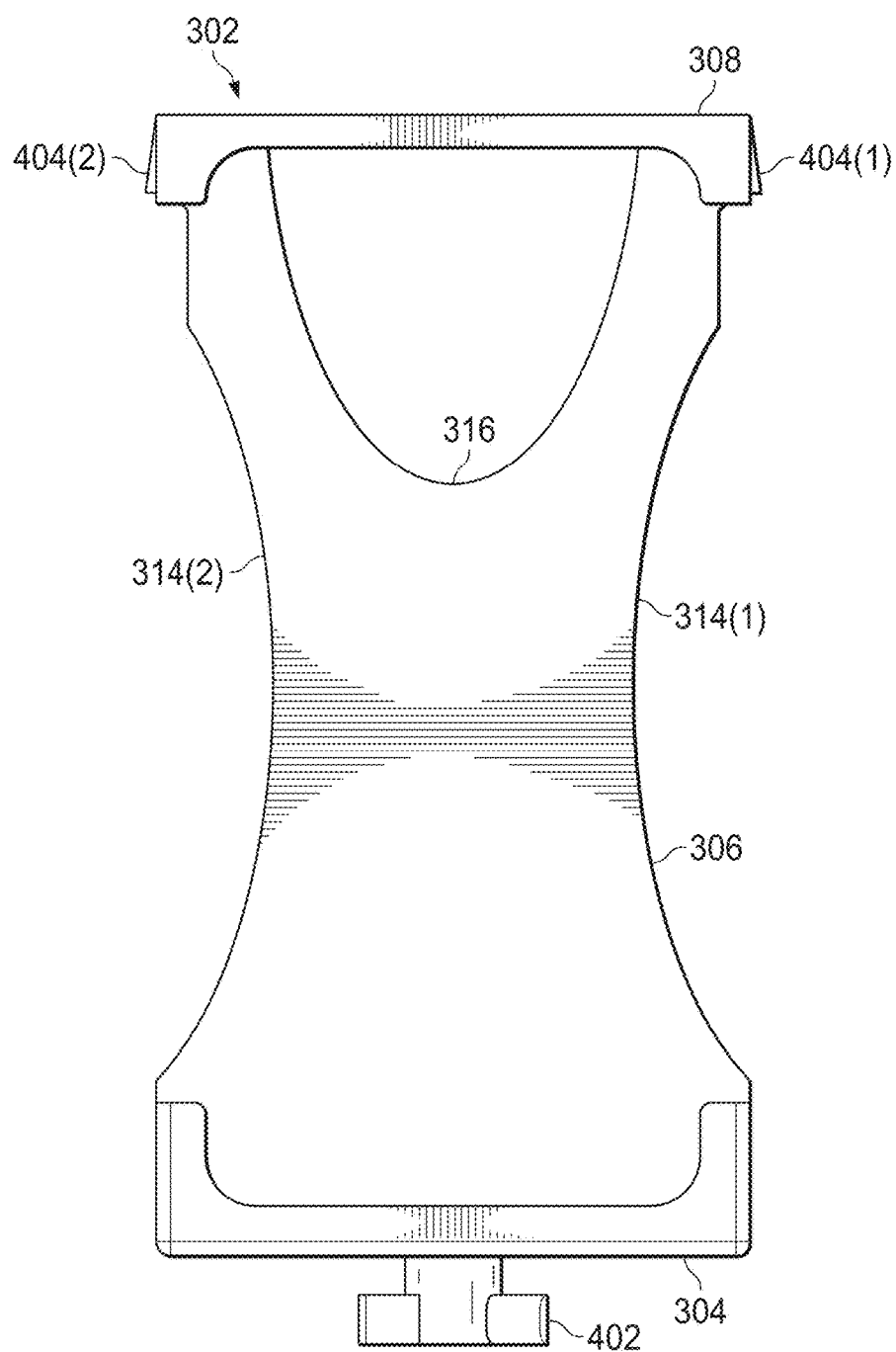
FIGS. 5A-5B illustrate an assembled handheld-computer case of the handheld-computer adapter.
Figure 5B:
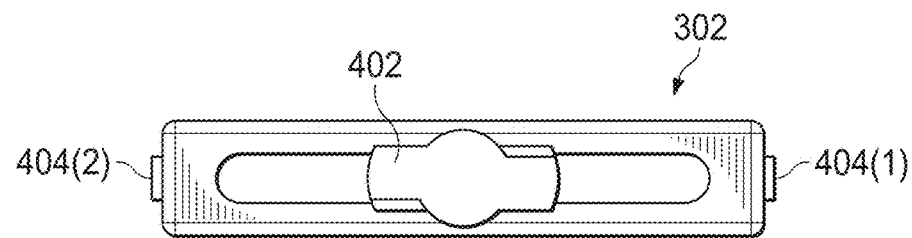

FIGS. 5A-5B show a front view and a bottom view, respectively, of the handheld-computer case 302. In addition to the features described relative to FIG. 3, FIGS. 5A-5B illustrate a key 402 that fits into a corresponding keyhole of the pedestal 312 of the sled adapter 303. In a typical embodiment, the key 402 is rotated, for example, 45°, in order to lock the handheld-computer case 302 into a desired position relative to the sled adapter 303.

Also illustrated in more detail are locking tabs 404(1) and 404(2) of the body portion 306 and that interact with the cap 308 in order to secure a handheld computer to the handheld-computer case 302. Those having skill in the art will appreciate that, in addition to securing a handheld computer to the sled 100, if the handheld computer were to be dropped or otherwise subjected to impact forces when mounted in the handheld-computer case 302, the configuration illustrated herein would serve to protect the handheld computer from such impact forces against, for example, a screen or an edge of the handheld computer. In addition to the above, although not expressly illustrated herein, those having skill in the art will appreciate that the handheld-computer case 302 can be designed to fit particular dimensions of a given handheld computer or could be designed to include spring-loaded features in order to accommodate a plurality of different dimensioned handheld computers. Moreover, one or more of magnetic elements, ratchets, and gears could be employed to further secure a handheld computer to the handheld-computer case 302 without departing from principles of the invention. Principles disclosed herein can be employed as a retrofit to existing sleds or part of new sled designs.

Figure 6A:
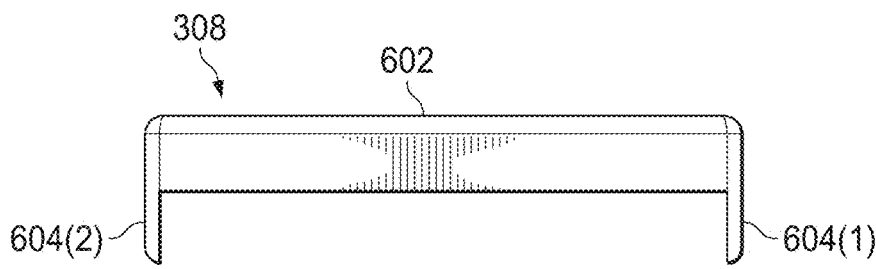
FIGS. 6A-6B illustrate a handheld-computer case cap of the handheld-computer case.
Figure 6B:
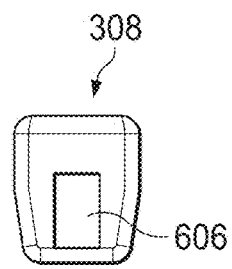

FIGS. 6A-6B illustrate a front and side view, respectively, of the cap 308 in more detail. The cap 308 includes a transverse member 602 from which legs 604(1) and 604(2) extend in a generally perpendicular direction therefrom. The legs 604(1) and 604(2) each have formed therein an orifice 606 that corresponds to one of the locking tabs 404(1) and 404(2) of the body portion 306 of the handheld-computer case 302.

Figure 7:
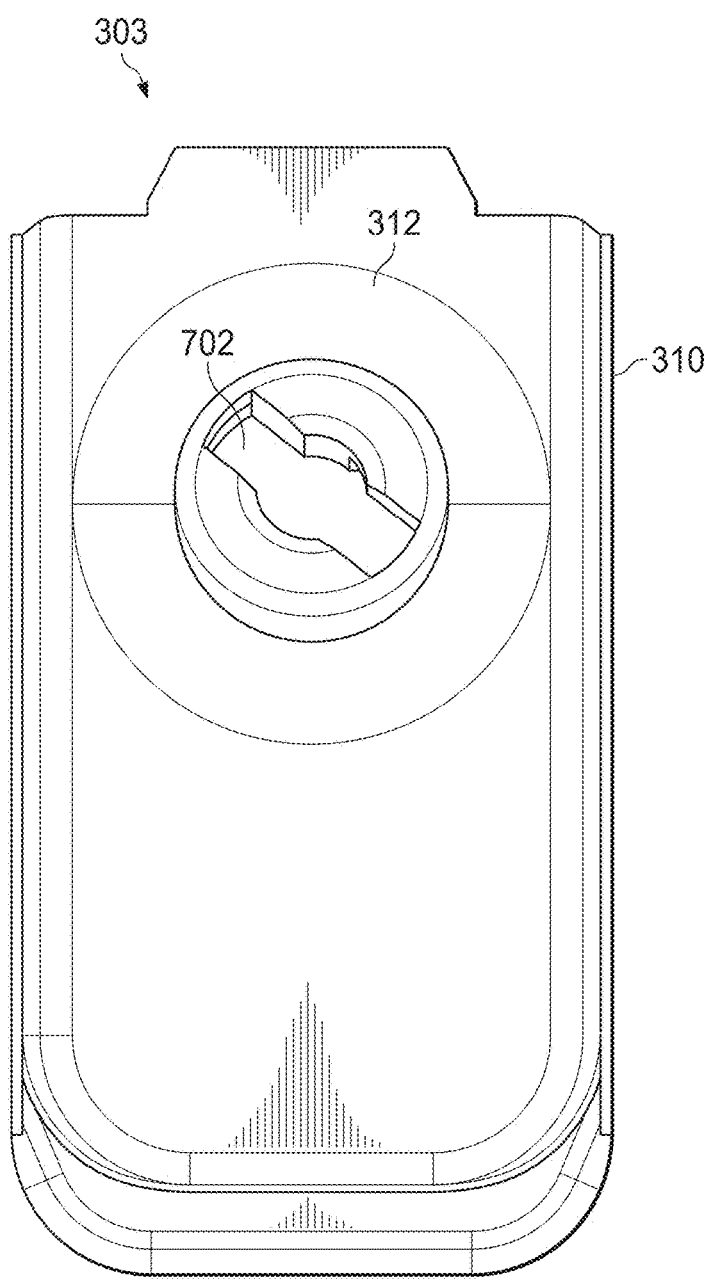
FIG. 7 illustrates a sled cover of the handheld-computer adapter.

FIG. 7 illustrates the sled adapter 303 in more detail. Formed within the pedestal 312 is a keyhole 702 that is adapted to receive the key 402 of the handheld-computer case 302. As shown in FIG. 7, the key 402 may be inserted into the keyhole 702 and then, upon insertion, rotated counterclockwise approximately 45° to lock the handheld-computer case 302 into place. In similar fashion, the handheld-computer case 302 can be rotated approximately 45° clockwise and then removed from the sled adapter 303.

Figure 8:
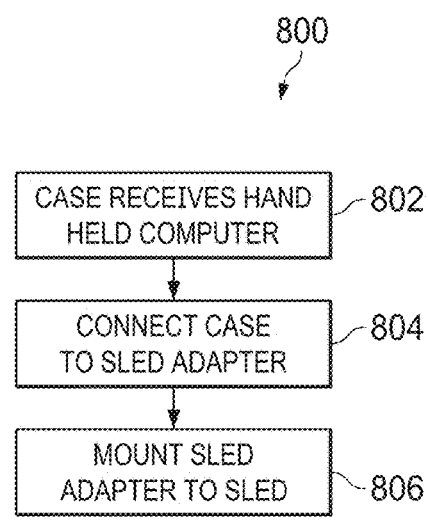
FIG. 8 is a flow chart of a process for mounting a handheld-computer adapter to a sled.

FIG. 8 is a flow chart of a process for mounting the handheld-computer adapter to a sled. A flow 800 begins at step 802. At step 802, a handheld-computer case receives a handheld computer. From step 802, execution proceeds to step 804. At step 804, the handheld-computer case is connected to a sled adapter. From step 804, execution proceeds to step 806. At step 806, the sled adapter is mounted to the sled. Steps 802, 804, and 806 can be performed in any order.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A system comprising:
   a handheld-computer case that selectively holds a handheld computer, the handheld-computer case comprising:
   a body portion adapted to receive the handheld computer;
   a removable cap that engages with a first end of the body portion and secures the handheld computer;
   a base bracket at a second end of the body portion that supports the handheld computer;
   a sled adapter comprising:

a pedestal adapted to receive the handheld-computer case; and a base portion adapted to mount the sled adapter to a sled; and wherein the body portion is adapted to position a screen of the handheld computer at a 45-90° angle relative to the base portion.

2. The system of claim 1, comprising the sled.

3. The system of claim 1, wherein the body portion comprises a plurality of indented edges that permit side buttons of the handheld computer to be accessed.

4. The system of claim 1, wherein the body portion comprises an indented edge that provides an unobstructed view to a rear-facing camera of the handheld computer.

5. The system of claim 1, wherein:
the handheld-computer case comprises a key; and
the pedestal has a keyhole formed therein and adapted to receive the key.

6. The system of claim 1, wherein:
the pedestal comprises a key; and
the handheld-computer case has a keyhole formed therein and adapted to receive the key.

7. The system of claim 1, wherein the base portion serves as a battery cover of the sled.

8. The system of claim 1, comprising at least one of a magnet, a gear, and a rachet to secure the handheld computer to the handheld-computer case.

9. A system comprising:
a handheld-computer case adapted to hold selectively a handheld computer in a position in which a rear-facing camera of the handheld computer has an unobstructed view, the handheld-computer case comprising:
  a body portion adapted to receive the handheld computer;
  a removable cap adapted to secure the handheld computer;
  a base bracket adapted to support the handheld computer; and a sled adapter adapted to receive the handheld-computer case and to be mounted to a sled.

10. The system of claim 9, wherein the body portion has formed therein a plurality of indented edges that permit side buttons of the handheld computer to be accessed.

11. The system of claim 10, wherein the sled adapter comprises a base portion that serves as a battery cover of the sled.

12. The system of claim 10, wherein the handheld-computer case comprises a removable cap engages with the body portion.

13. The system of claim 12, wherein the base bracket is positioned opposite the removable cap.

14. The system of claim 9, wherein:
the handheld-computer case comprises a key; and
the sled adapter comprises a pedestal, the pedestal having a keyhole formed therein and adapted to receive the key.

15. The system of claim 9, comprising at least one of a magnet, a rachet, and a gear to secure the handheld computer to the handheld-computer case.

16. A method comprising:
receiving, by a handheld-computer case comprising a base bracket, a body portion, and a removable cap, a handheld computer, the receiving comprising:
  the base bracket supporting the handheld computer; and
  the removable cap retaining the handheld computer;
selectively connecting the handheld-computer case to a sled adapter via a key-and-keyhole arrangement; and
wherein a screen of the handheld computer is positioned at a 65-85° angle relative to the sled adapter.

17. The method of claim 16, comprising connecting the sled adapter to a sled.

18. The method of claim 17, wherein the steps are performed in the order listed.

* * * * *